United States Patent

[11] 3,581,568

| [72] | Inventor | Irving Pfefer<br>6232 Atoll Ave., Van Nuys, Calif. 91401 |
|---|---|---|
| [21] | Appl. No. | 720,757 |
| [22] | Filed | Apr. 12, 1968 |
| [45] | Patented | June 1, 1971 |

[54] APPARATUS FOR HOLDING A THERMOMETER
6 Claims, 2 Drawing Figs.

[52] U.S. Cl. .................................................. 73/343
[51] Int. Cl. ............................................. G01k 13/02
[50] Field of Search.......................................... 73/349,
374, 363.9, 363.7, 363.5, 347, 339, 346, 343;
137/90

[56] References Cited
UNITED STATES PATENTS

| 2,981,106 | 4/1961 | Knudsen.................. | 73/339 |
| 3,174,340 | 3/1965 | Britt........................ | 73/343 |
| 2,626,524 | 1/1953 | Harman.................... | 73/349 |

FOREIGN PATENTS

| 862,375 | 1/1953 | Germany................... | 73/349 |
| 355,968 | 9/1961 | Switzerland.............. | 73/363.9 |

Primary Examiner—Louis R. Prince
Assistant Examiner—Denis E. Corr
Attorney—Lindenberg and Freilich ABSTRACT: Apparatus for holding a stem thermometer to measure the temperature of water issuing from a faucet comprising a fitting body with a first end for coupling to the faucet, a second end for discharging water from the body into a pipeline or directly into a sink, and a third end for receiving a stem thermometer so that its stem extends across the path of water flowing through the fitting body. The third end is oriented at less than 90° with the first end so that it extends with a downstream component, thereby preventing the passage of water through the third opening when the thermometer is removed and the second end is opened to allow water to fall directly into the sink. The fitting body is also provided with a fourth end located opposite the third end, for receiving the outer end of the stem of a thermometer, the fourth end being sealed to prevent the outflow of water therefrom.

PATENTED JUN 1 1971

3,581,568

INVENTOR.
IRVING PFEFER

BY Lindenberg & Freilich

ATTORNEYS 3,581,568

APPARATUS FOR HOLDING A THERMOMETER

BACKGROUND OF THE INVENTION

1. Field of the Invention

This invention relates to fluid control apparatus.

2. Description of the Prior Art

The developing of photographic film generally involves steps which the film must be thoroughly washed to remove the previous chemical solutions. It is generally important to utilize water within a predetermined range of temperatures, inasmuch as water which is too cold is not effective and water which is too hot can damage the film. While a thermometer can be laid in a washing tank or repeatedly held under a water faucet, this is annoying and hampers efficient processing.

OBJECTS AND SUMMARY OF THE INVENTION

An important object of the invention is to provide apparatus for the improved washing of photographic film.

Yet another object is to provide a fixture for facilitating the use of a stem thermometer.

In accordance with the present invention, a fixture is provided between the faucet and conduit, to enable a thermometer to be held in the water stream for measuring the water temperature. The fixture has a thermometer-holding boss which enables a stem-type thermometer to be held in the flow. The aperture in the boss is directed perpendicular or downstream to the flow of water through the fitting. The thermometer can be readily removed from the fitting for use in many other applications requiring a thermometer in a film developing laboratory. Even though the thermometer removal leaves a hole in the fitting, the water faucet can still be used when the conduit leading from the fitting is detached, without leakage of water through the thermometer-receiving hole.

DESCRIPTION OF THE PREFERRED EMBODIMENTS

Figure 1:
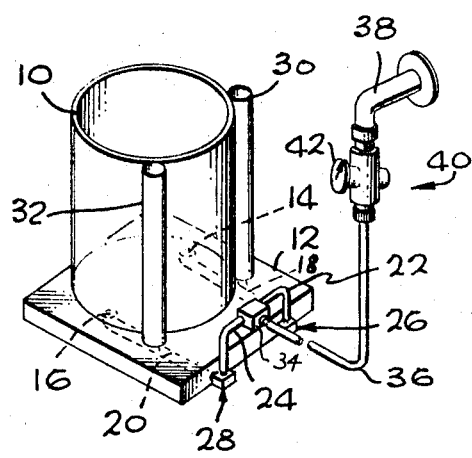
FIG. 1 is a pictorial view of the film-washing apparatus of the invention.

FIG. 1 illustrates film-washing apparatus comprising a cylindrical washing tank 10 into which film to be washed is placed. The tank is supported on a base 12, which also serves as the bottom of the tank. The base has two agitation holes 14 and 16 through which an air and water mixture emanates for filling up the tank with water and for agitating the water already in the tank. The agitation holes 14 and 16 are connected to passageways 18 and 20 formed in the base. The ends of the passageways opposite the agitation holes are coupled to hose sections 22 and 24 through couplings 26 and 28. The middle sections of the passageways 18 and 20 are coupled to snorkel tubes 30 and 32 through holes in the base.

The hose sections 22 and 24 are connected by a T-coupling 34 to a hose 36 that leads to a water faucet 38. A fitting 40 in series with the faucet and hose 36 enables a stem thermometer 42 to be held in the pipeline to measure the temperature of the water flowing to the tank. When the faucet is turned on, a stream of water passes through the fitting 40 and hose 36 to the two passageways 18 and 20. The water moves past openings in the passageways where they connect to the snorkel tubes 30 and 32. Air is drawn into the passageways through the snorkel tubes so that an air-water mixture enters the tank through the agitation holes 14 and 16. Air bubbles rise through water already in the tank to provide an agitating effect that helps to wash film in the tank.

When photographic films are being washed, it is generally necessary to maintain the washing temperature within certain limits. If the film is left too long in hot water, the film base may become soft, and the film may be damaged. On the other hand, if the water is too cold, the developing solutions will not be dissolved away. Generally a temperature on the order of 20° C. is desired.

In order to maintain a close control on temperature, the fitting 40 is provided which enables the stem thermometer 42 to be held in the water stream which is applied to the washing tank. The stem thermometer 42 is used in many applications in film processing, but small film laboratories often have only one or two of them because accurate thermometers are costly. In accordance with the present invention, the fitting 40 is provided which facilitates the removal of the stem thermometer 42 after washing is completed, to enable the thermometer to be used in other applications.

Figure 2:
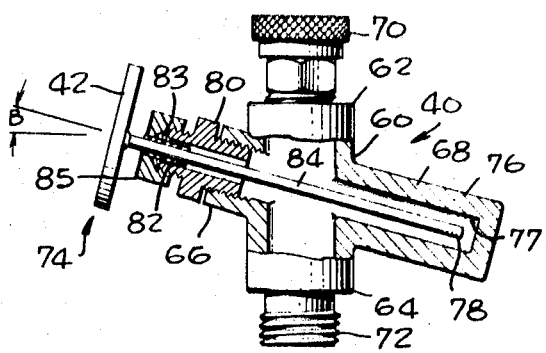
FIG. 2 is a sectional view of the thermometer-holding fixture of FIG. 1.

As shown in FIG. 2, the fitting 40 comprises a body 60 having four hollow ends 62, 64, 66, and 68 which are connected to each other within the body. The end 62 carries an adapter 70 for connection to a faucet while the opposite end 64 carries a nipple 72 for connection to the end of a hose. The end 66 is adapted to carry a thermometer assembly 74 which includes the stem thermometer 42. The opposite end 68 has a receiving plug portion 76 which is formed with a recess 77 for receiving the outer stem end 78 of the stem thermometer. The recess generally does not support the thermometer, but merely provides a receiving area for it.

The thermometer assembly 74 comprises a sleeve 82 of thermally insulative material such as a plastic which is tightly fitted over the stem 84 of the thermometer. A compression fitting 83 is fastened around the sleeve. An adapter 80 which is threadably engaged with the end 66 of the fitting, receives the compression fitting 83. A holding nut 85 holds the compression fitting in place on the coupling 80, and prevents the leakage of water around the compression fitting. Tapered pipe threads are employed on coupling 80 to provide a watertight seal between it and the end 66 of the fitting. The fitting 40, adapter 80, nut 85, sleeve 82 and compression fitting 83 form a housing for receiving the thermometer, with a small opening for providing a seal around the narrow diameter stem of the thermometer and a larger stem-receiving portion at 68 for receiving an end of the stem, the hollow portion at 68 being larger than the stem to allow water to circulate about the stem portion therein.

In order to install the thermometer assembly 74, the stem 84 is inserted through the coupling 80 at the fitting end 66. The nut 85 is turned until it holds the compression fitting in place. The thermometer is left in place during the washing process to enable adjustment of the hot water and cold water controls on a typical water faucet to achieve the desired washing temperature. When the washing process is over, the thermometer can be removed by simply unscrewing the nut 85, and the thermometer can then be taken to other areas where it is needed.

Often, it is desired to use the faucet 38 after the thermometer assembly has been removed from the fitting 40. This can be accomplished by removing the hose 36 which is coupled to the nipple 72 at the end of the fitting. When the faucet is then turned on, water does not leak through the opening in the end 66 of the fitting body, so long as a narrow constriction is not coupled to the nipple 72 that would create a large back pressure. To further aid in preventing leakage and to facilitate the viewing of the thermometer dial, the end 66 of the fitting body is tilted up while the opposite end 68 is tilted down. The tilting is at an angle B on the order of 15° with respect to water flow past the end 66 where it connects to the flow between ends 62 and 64 of the fitting. This results in the thermometer facing at a slightly upward tilt, so that it is easier to read, and also results in the hole in the end 66 being directed somewhat downstream. The downstream direction helps to prevent the flow of water out of the end 66 when the thermometer assembly is removed.

Although particular embodiments of the invention have been described and illustrated herein, it is recognized that modifications and variations may readily occur to those skilled in the art, and, consequently, it is intended that the claims be interpreted to cover such modifications and equivalents.

What I claim is:

1. Apparatus for holding a stem thermometer comprising:
    a housing forming an internal region, said housing having
        first means defining a first opening for connection to a source of fluid, second means defining a second opening for exit of said fluid, third means defining a third opening for receiving the inner end portion of a stem thermometer, and a stem-receiving portion positioned on a side of said internal region opposite said third opening, said stem-receiving portion having an elongated recess with an inner end in fluid communication with said internal region and an outer end sealed against the outflow of water, said elongated recess of said stem-receiving portion having a diameter greater than said third opening and oriented at an angle of more than 90° with said first means so that it extends with a downstream component with respect to fluid flowing from said first means to said second means, whereby fluid flowing between said first and second openings can readily flow about the portion of the stem in said stem-receiving portion.

2. The apparatus as described in claim 1 including:
a thermometer with an elongated stem, said thermometer having an end with dial means thereon for indicating temperature, said elongated stem extending therefrom for contacting fluid whose temperature is to be measured, said thermometer also including fastening means positioned around said stem for rapid attachment and removal from said third means on said housing, said stem having a length passing through said third means, said internal region and at least partially into said stem-receiving portion.

3. Apparatus for holding a stem thermometer comprising:
a housing having an internal region, a first end portion defining a passageway with an inner end in fluid communication with said internal region and an outer end for coupling to a fluid source, a second end portion opposite said first end portion and defining a passageway with an inner end communicating with said internal region and an outer end for discharging fluid, a third end portion located between said first and second end portions and defining a passageway with an inner end in fluid communication with said internal region and an outer end for receiving a stem thermometer, said passageway of said third end portion oriented at an angle of less than 90° with said passageway of said first end portion, and a fourth end portion located opposite said third end portion and substantially aligned with it, said fourth end portion defining a passageway having a diameter greater than the narrowest diameter of said third end portion and which has an inner end in communication with said internal region of said fitting body and an outer end which is sealed against the outflow of fluid, whereby fluid flowing between said first and second openings can readily flow about the portion of the stem in said passageway of said fourth end portion.

4. The apparatus described in claim 3 wherein:
said passageways of said first and third end portions are angled at less than about 75° from each other.

5. The apparatus described in claim 3 including:
a thermometer having a portion for reception in said outer end of said third end portion, an elongated stem extending from said portion of said thermometer for reception in said internal region of said housing and said passageway of said fourth end portion for contacting a fluid stream passing through said housing, said housing including fastening means for rapid attachment and removal of said thermometer from said third end portion, said stem having a length sufficient to pass completely through said third end portion and said internal region, and at least partially into said passageway of said fourth end portion.

6. Apparatus for holding a stem thermometer comprising:
a housing forming an internal region, said housing having first means with an outer end constructed for coupling to a household faucet so that said housing hangs down from said faucet, second means defining an opening for directing water downwardly into any sink that is positioned below the faucet, third means defining an opening for receiving the inner end portion of a stem thermometer, and a stem-receiving portion positioned on a side of said internal region opposite said third opening, said stem-receiving portion having an elongated recess with an inner end in fluid communication with said internal region and an outer end sealed against the outflow of water, said third means including a tubular portion extending on the order of 15° upwardly from the horizontal when said housing is positioned on a faucet so that said opening of said second means is directly below said first opening, whereby to facilitate reading of the thermometer.